…

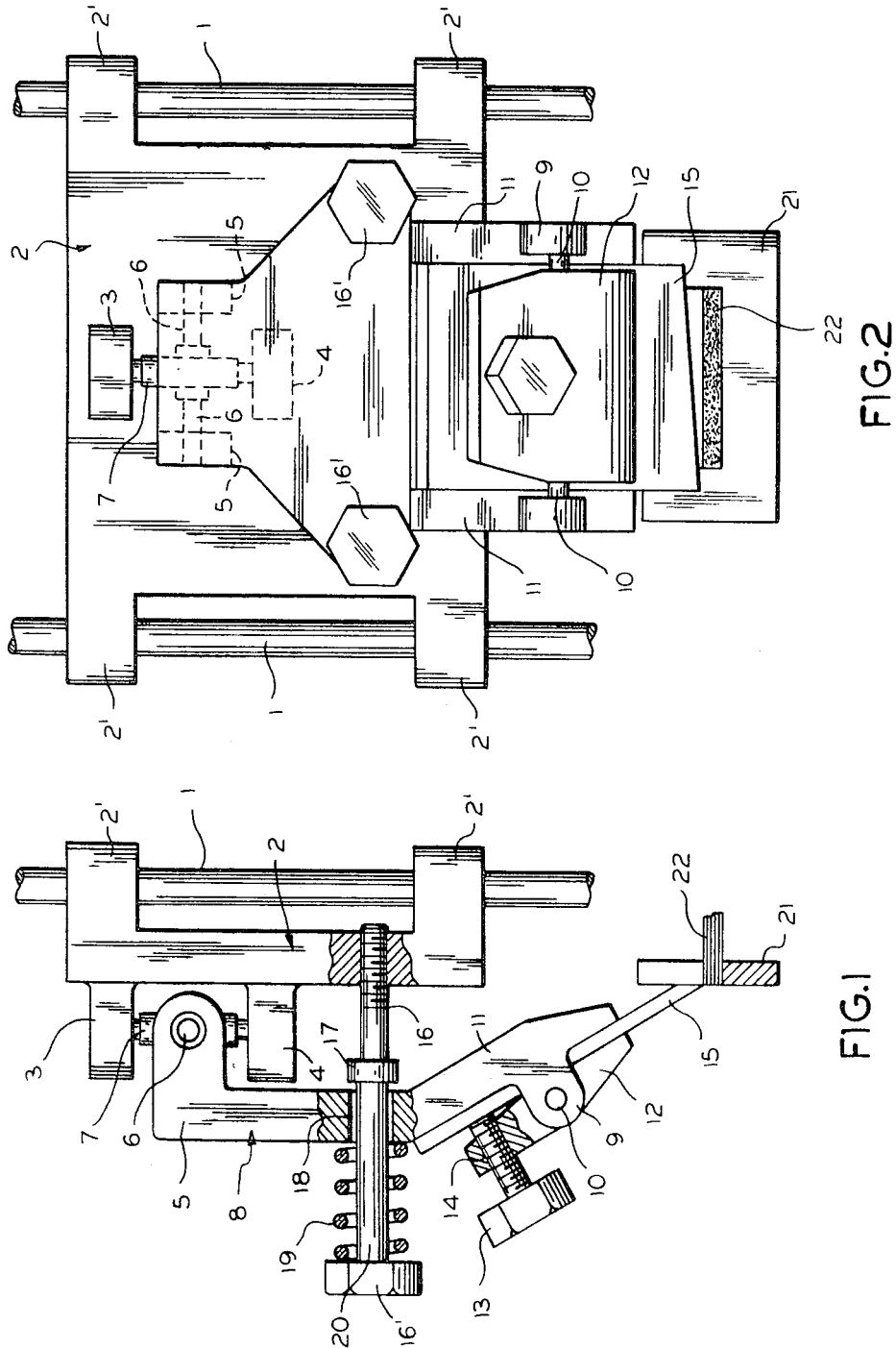

United States Patent Office 3,623,388
Patented Nov. 30, 1971

3,623,388
RECIPROCATING KNIFE CUTTER FOR THE CUTTING OF FIBER CABLES, FOILS AND THE LIKE
Helmut Göttling, Gottstreu (Weser), and Karlheinz Richter, Lofelden, Germany, assignors to Glanzstoff AG, Wuppertal, Germany
Filed Mar. 9, 1970, Ser. No. 17,773
Claims priority, application Germany, Mar. 27, 1969,
P 19 15 600.4
Int. Cl. B23d *15/02, 35/00*
U.S. Cl. 83—582
6 Claims

ABSTRACT OF THE DISCLOSURE

Shearing apparatus for the cutting of foils, fibers and the like with a guillotine-action knife, one blade of which is a stationary, U-shaped blade and the other of which reciprocates across the stationary blade, the holder for the reciprocating blade being mounted on a reciprocable carriage by a three-point suspension consisting of a universal joint at the apex and two resiliently-biased, laterally spaced, adjustable supports at the corners of the base of the three-point suspension.

INTRODUCTION

Previously known devices for the shearing of foils, fibers and the like consist, as a rule, of a lower blade fixed on the machine frame and of an upper blade which can be reciprocated up and down on a guide structure. The primary disadvantages with the known devices reside in their assembly. For example, the upper blade has to be bolted to a blade-holder by means of a template, which blade holder in turn is fastened to the reciprocating blade support frame. The accurate adjustment of the relative positions of the blades causes considerable difficulties. In addition, the adjustment must be undertaken anew with each exchanging of the upper blade. As a rule, in the case of the known designs, a uniform contact pressure between upper blade and lower blade cannot be attained for which reason the service lives of each knife are very different.

THE INVENTION HEREIN

The primary objectives of this invention are to provide shearing apparatus with which a uniform shearing action over the entire blade width is attained with low blade wear in the attainment of clean, uniform cuts, relatively constant from knife to knife, with long, blade-service life. In addition, the invention allows slightly bent or warped blades to be employed in a manner whereby the blade-edge becomes straight again without the contact pressure to become non-uniform and/or excessive.

According to the invention, these objectives are attained by the feature in a shearing apparatus wherein the reciprocating knife or blade is fastened to a reciprocating blade-holder and cuts in guillotine fashion in cooperation with a stationary blade or knife. The reciprocating knife holder is mounted on a sliding carriage by a three-point mounting means. One point consists of a double pivot, universal joint, and the other two points are pin or rod mountings, each with yieldable biases pressing the reciprocating blade toward or against the stationary blade. Preferably, the stationary blade is U-shaped, in which case the crossbar of the U-shaped blade forms the cutting edge.

The urging of the reciprocating blade against the stationary blade can be accomplished in different manners, for example, pneumatically. However, preferably the biases are spring-loaded biases. In this case, it is expedient that the blade-holder is pressed toward the stationary blade with uniform forces at the pin or rod mountings. Expediently, the two pins or rods are equipped with adjustable stops in order to assure resetting of the reciprocating blade when needed and therewith assure longer service lives of the blades.

Finally, it is, as a rule, advantageous to provide the blade-holder for the reciprocating blade with a clamping shoe, under which the blade is clamped. Slightly bent blades may be used without having to put up with the disadvantages of the known devices under the more complicated conditions.

The holder for the blade of the reciprocating knife is constructed in such a manner that the straightening of the blade is not necessary. The holder is very resistant to bending compared with the blade. The blade is pressed tight against the holder by a clamping shoe. Through this kind of clamping, it is possible in simple manner to straighten distorted blades, so that their entire knife-edge bevel can ride flat against the stationary blade. Thereby, the specific stress on the knife edge is considerably reduced, the blade wear is decreased and the blade service life is increased. The shearing action is also considerably better and more uniform.

Since the upper fastening of the blade-holder is constructed as double pivot, universal joint, the reciprocating blade may be moved around two axes perpendicular to each other. The cutter edge of the reciprocating blade will always lie flatly against the stationary blade under the urgings of the two biases, preferably the aforesaid pressure springs. In this case, the same contact pressure can be easily adjusted for all blades, or it may be changed over a wide range through changing of the spring tensions. Therefore, changes or adaptations necessitated by cutting characteristics of different materials to be cut do not cause serious difficulties.

It is of special importance that even slightly distorted blades can be pressed flat against the blade-holder in the construction according to the invention by means of an accurately ground clamping shoe and the opposing, plane, bearing surface of the holder in such a manner that they rest flatly on the bearing surface. The cutting surfaces thereby are uniform relative to each other across their entire length.

The adjustable stops can be set in a manner whereby they limit the spring biased movement of the blade holder and blade to provide a narrow clearance between the reciprocating blade or knife and the stationary blade. Thus, the sliding contact pressure between the two blades can be reduced essentially to zero. On the other hand, the clearance can be adjusted to such a fine degree that an essentially perfect cutting action is maintained. Under these circumstances, the wear on the blades is essentially only that resulting from the cutting action itself. Thus, in comparison with previously known shearing devices, the invention herein increases it through overall efficiency of the shearing devices in a multifold manner as a result of the very short period of cutting per stroke of the reciprocating knife and particularly as a result of the extended service life of the blades or knives. These advantages are attained without sacrifice of uniformity and cleanness of cut over the entire length of the blades.

THE DRAWING

A preferred embodiment of the invention is illustrated in the drawing wherein:

FIG. 1 is a side elevation thereof with segments shown in cross section to facilitate the illustration; and FIG. 2 is a front elevation thereof.

THE PREFERRED EMBODIMENT

The shearing apparatus of the invention comprises two parallel bars or rods 1 which are fixedly mounted on a frame (not shown). A sliding carriage 2 is slidably mounted on the rods or bars 1 for reciprocating movement thereon under the influence of a reciprocating drive (not shown). In the illustrated embodiment, the sliding carriage 2 has four ears 2' containing slide bearings to provide the reciprocating mounting of the sliding carriage 2 on the rods or bars 1.

A pair of pivot bearings 3 and 4 is provided on the front face of the sliding carriage 2. These bearings pivotally support the vertical pivot shaft 7. A pair of horizontal, stub shafts 6 extends laterally from the shaft 7. The rearwardly directed ears 5 of the blade holder 8 are in turn pivotally mounted on the shafts 6 to provide a universal joint support for the blade holder 8 on the sliding carriage 2. The respective pivot axes of the universal joint constitute the vertical shaft 7 and the horizontal shafts 6.

The upper portion of the blade holder 8 is substantially parallel to the front face of the sliding carriage 2 and the rods or bars 1. The lower portion 11 depends from the upper portion and extends diagonally downwardly toward the stationary blade 21.

The reciprocating blade 15 is mounted on the lower portion 11 and is held thereon by a pivotable pressure plate 12. The plate 12 is pivotally mounted by stub shafts 10 which are pivotally mounted in the ears 9 projecting laterally downwardly from the lower portion 11. A bolt 13 is threadedly mounted in tapped hole 14 in the upper portion of the plate 12. Upon tightening of the bolt 13, the blade or knife 15 is clamped against the outer face of the lower portion 11 by the pressure of the bolt and the pressure of the flat, contact face of the lower portion of the plate 12 against the blade or knife 15.

Each lower corner of the upper portion of the blade holder 8 has a bore 18. The shaft of a bolt 20 extends through each respective bore. The threaded end 16 of each bolt 20 is threaded in a tapped hole in the carriage 2. The shank of the bolt 20 preferably is provided with a projection, e.g., a ring flange 17 fixedly or threadedly attached to the shank of the bolt 20 behind the upper portion of the blade holder 8. The distance between the flange 17 and the front face of the slide carriage 2 can be adjusted by turning the bolt 20.

A coil spring 19 is interposed between each bolt head 16' and the blade holder 8. These springs resiliently bias the blade holder 8 toward the stationary blade 21. The tension of the coil springs 19 is also adjustable by turning of the bolt 20. The deeper the threads 16 are screwed into the slide carriage 2, the more the respective springs 19 become compressed. Consequently the contact pressure of the blade 15 against the stationary blade 21 is increased by tightening the bolts 20 and is decreased by loosening of the bolts 20.

If contact pressure between the blade 15 and the stationary blade 21 is to be minimal or is to be eliminated the bolts 20 are loosened sufficiently so that the blade 15 does not touch the blade 21. In such case, the blade holder 8 will pivot until it rests against the ring flanges 17. The clearance, if any, between the cutting edge of the blade 15 and the stationary blade 21 can be set by the repositioning of the blade 15 in the lower portion 11 of the holder and/or turning the bolts 20.

One of the advantages of the aforedescribed clamping of the reciprocating blade 15 by the pressure plate 12 lies in the feature that a slightly bent knife or blade 15 can be straightened by virtue of the pressure exerted between the opposed, flat, blade-contacting faces of the lower portion 11 and the pressure plate 12. Thus, non-planar deviations, e.g., distortions resulting during hardening of the knife or blade 15, are corrected when the blade 15 is clamped between said opposing faces.

The invention thus provides a reciprocating knife having a three-point suspension provided by the universal joint at the apex and the two resiliently biased, adjustable supports on the bolts 20 at the two lower corners of the three-point suspension. The universal joint allows the blade 15 to have universal movement under the resilient bias of the springs 19. The cutting edge of the blade 15 thus constantly rides with the desired pressure against the stationary blade 21 or with the desired clearance therebetween in the case where the upper portion of the blade holder 8 abuts against the ring flanges 17. By appropriate adjustment of the pressure of the springs 19 in the manner aforedescribed, foils or bundles of filaments 22 may be cut cleanly with each downward stroke of the blade 15 with minimum wear on the respective blades or knives 15 and 21.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

We claim:

1. A shearing device adapted for the cutting of foils, fibers and the like which comprises a reciprocable carriage, a stationary blade, a reciprocable blade adapted to reciprocate in guillotine-like shearing relationship across said stationary blade, and means mounting said reciprocable blade on said carriage characterized by a bladeholder supported on said carriage by a three-point suspension comprising a double pivot, universal joint at the apex and a pair of laterally spaced guide members at the base of the three-point suspension, and means for adjusting the position of said blade holder and reciprocable blade thereon for movemnet toward or away from said stationary blade.

2. A shearing device as claimed in claim 1 wherein said stationary blade is U-shaped with the shearing edge of said blade being the cross-leg thereof.

3. A shearing device as claimed in claim 1, and bias means acting on said blade-holder and urging said reciprocable blade toward said stationary blade.

4. A shearing device as claimed in claim 3 wherein said bias means is spring means.

5. A shearing device as claimed in claim 3, and adjustable stop means adapted to limit said movement toward said stationary blade.

6. A shearing device as claimed in claim 1, and a pressure plate pivotally mounted on said blade-holder and clamping said reciprocating blade on said blade-holder.

References Cited

FOREIGN PATENTS 501,583   11/1954   Italy _____ 83—582

JAMES M. MEISTER, Primary Examiner

U.S. Cl. X.R.

83—636, 640, 699, 913